United States Patent [19]
Whalen et al.

[11] 3,744,118
[45] July 10, 1973

[54] SOLID STATE METHOD FOR CONSOLIDATING SMALL PIECES OF METAL INTO A WORKPIECE

[75] Inventors: Mark E. Whalen, Pepper Pike; Norman W. Trepanier, Rocky River; Robert A. Kraus, Shaker Heights, all of Ohio

[73] Assignee: Republic Steel Corporation, Cleveland, Ohio

[22] Filed: Mar. 8, 1971

[21] Appl. No.: 121,861

[52] U.S. Cl. .............. 29/403, 29/420.5, 100/38, 100/232, 100/DIG. 1, 425/78
[51] Int. Cl. ............................................ B23q 17/00
[58] Field of Search ..................... 29/403, 420.5; 425/78, 421, 456; 100/232, 35, 38, DIG. 1

[56] References Cited
UNITED STATES PATENTS

| | | | |
|---|---|---|---|
| 3,626,578 | 12/1971 | Price et al. | 29/403 |
| 2,794,386 | 6/1957 | Beecher et al. | 100/232 X |
| 2,985,101 | 5/1961 | Hillstrom | 100/232 X |
| 3,005,403 | 10/1961 | Van Endert | 100/232 X |
| 3,626,577 | 12/1971 | Trible | 29/403 |
| 2,333,271 | 11/1943 | Paterson | 29/420.5 |
| 2,383,766 | 8/1945 | Brassert | 29/420.5 X |
| 2,549,642 | 4/1951 | Seelig | 425/456 X |
| 2,909,826 | 10/1959 | McElroy | 425/421 |
| 3,416,354 | 12/1968 | Fisher | 72/453 |
| 3,438,320 | 4/1969 | Raab | 100/35 |

Primary Examiner—Charles W. Lanham
Assistant Examiner—D. C. Reiley, III
Attorney—Robert P. Wright and Joseph W. Malleck

[57] ABSTRACT

A method is disclosed of converting scrap or other random sized small pieces of steel into a useful, commercial product while maintaining the steel in a solid state. The pieces are baled and compacted until the bale is from 20 percent to 40 percent solid, and thereafter further compacted until the bale becomes solid and substantially free of voids. The bale is then heated and compressed until the pieces are welded together into a cohesive, homogeneous slab. Prior to the completion of bale compression the bale is heated to from 1,200° to 2,350° F. The bale compression is preferably effected by repeated impaction in a harmonic press employing a pair of opposed, oppositely acting platens impacting opposed outer surfaces of the bale.

36 Claims, 14 Drawing Figures

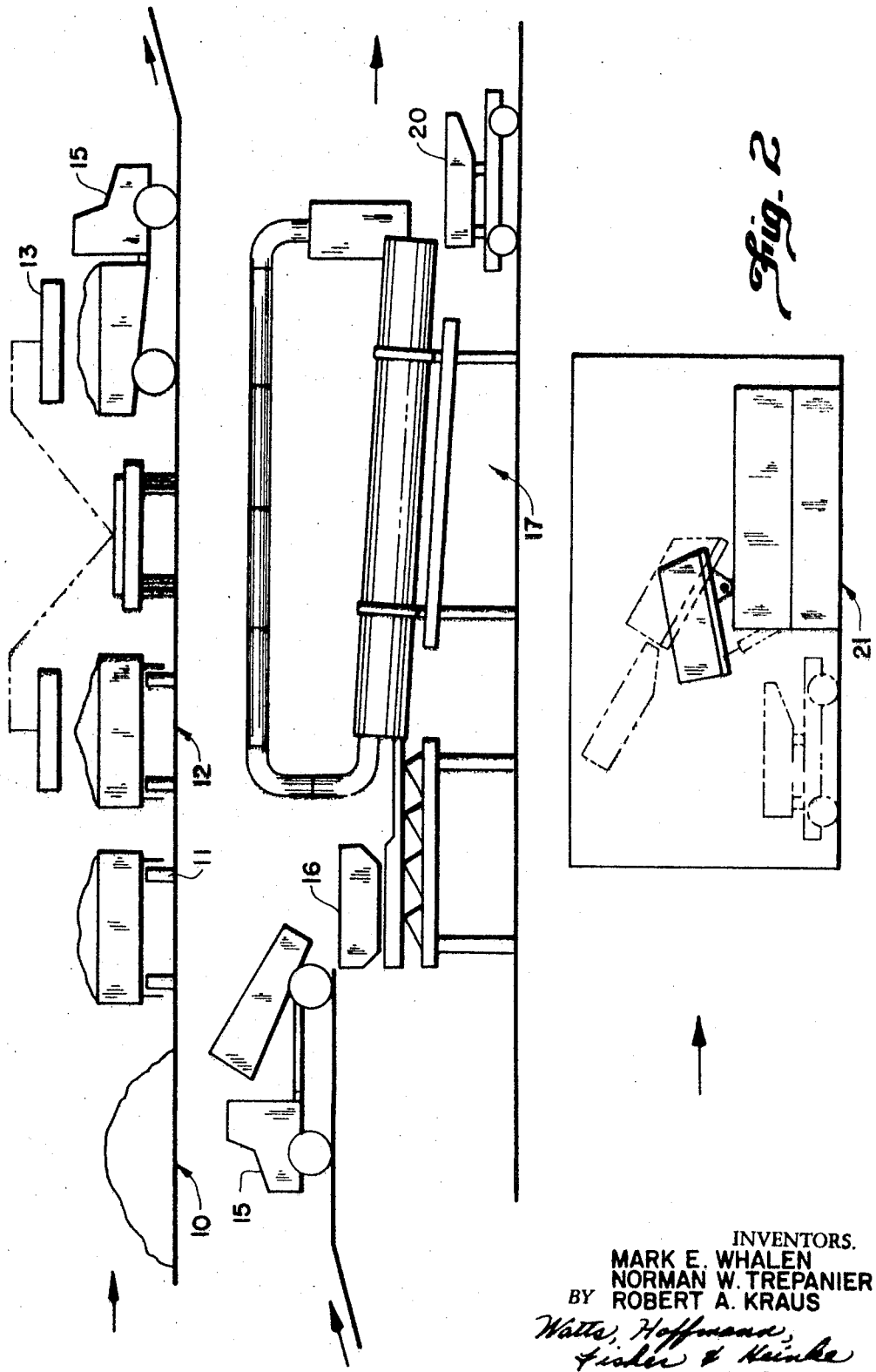

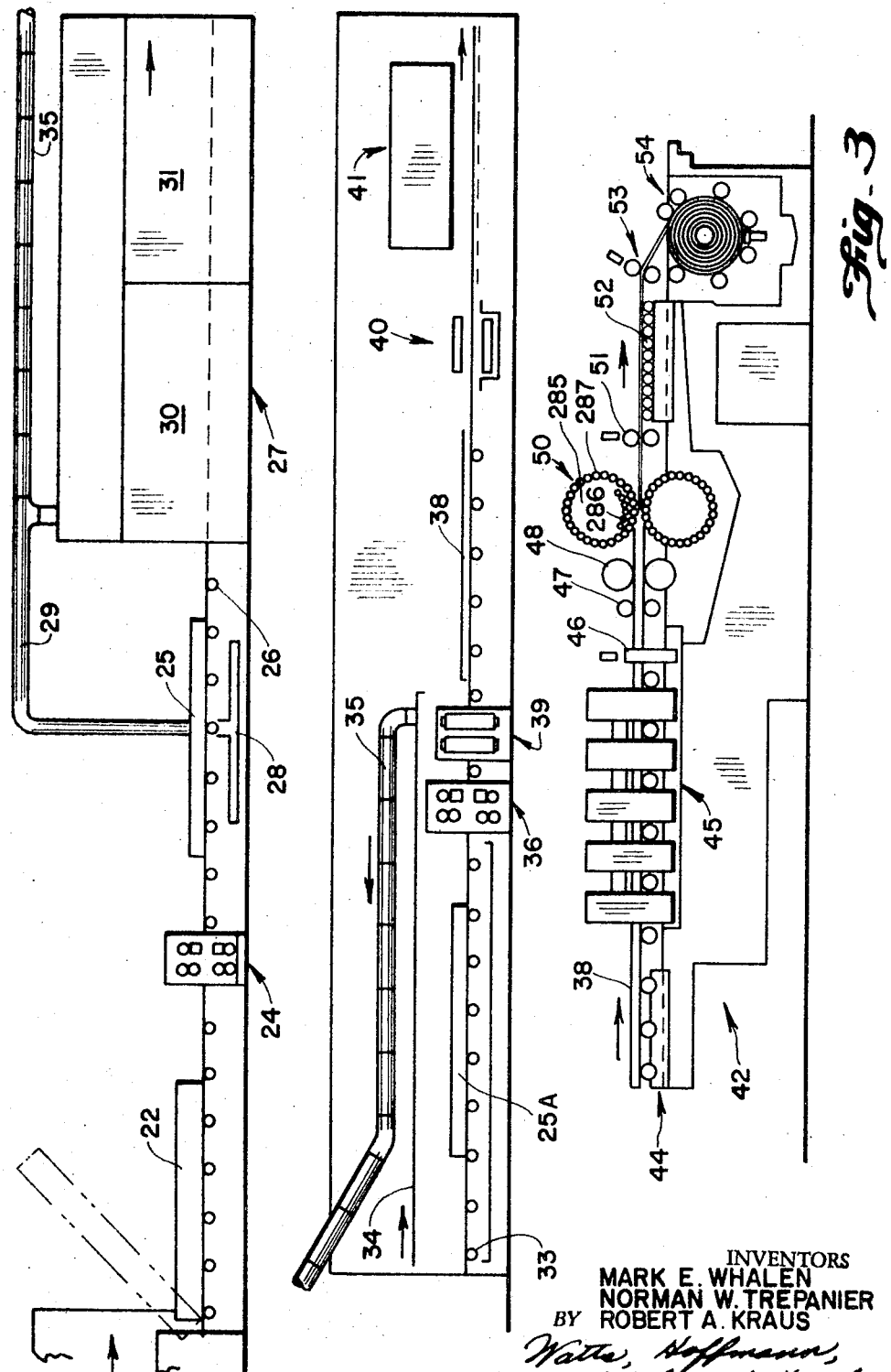

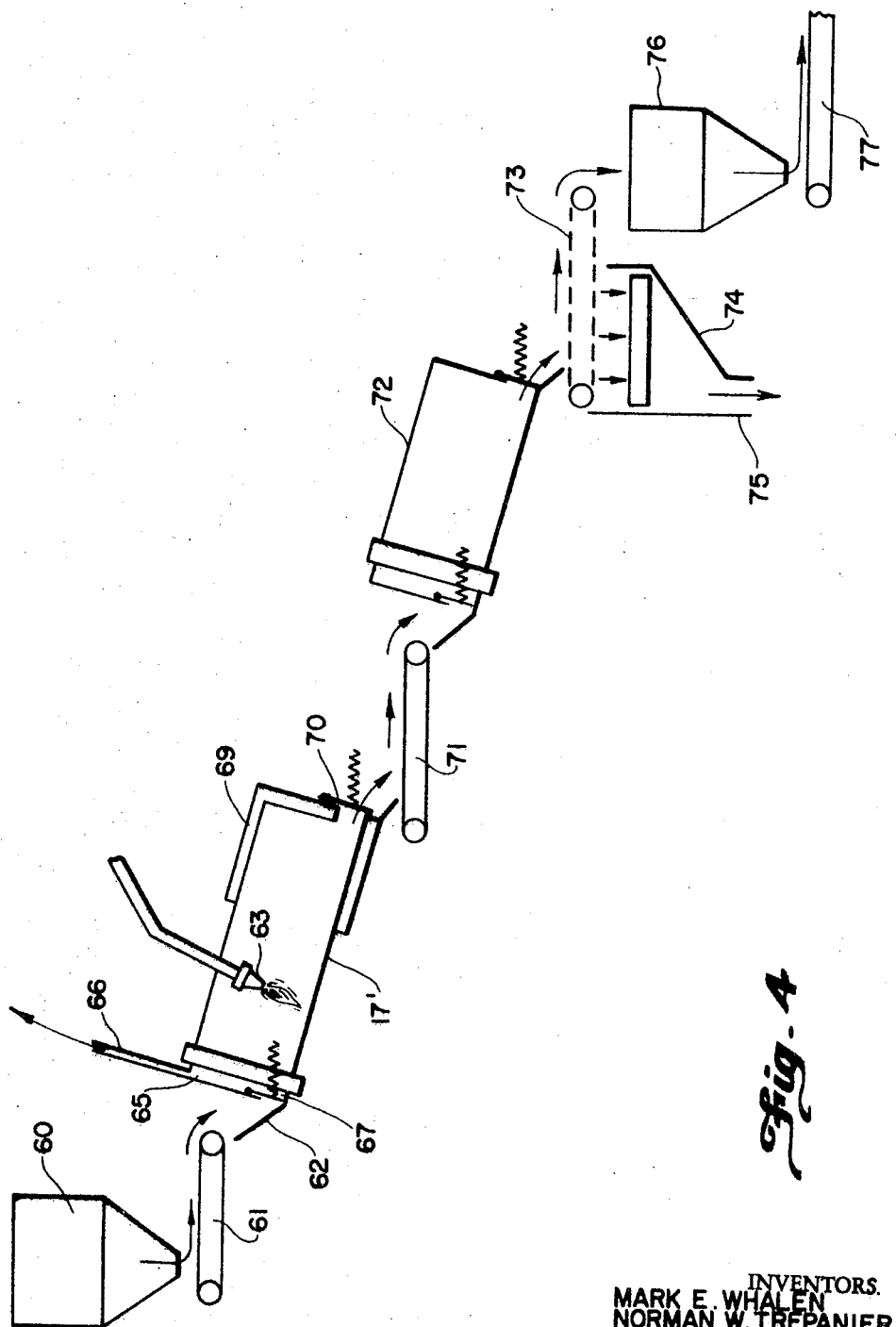

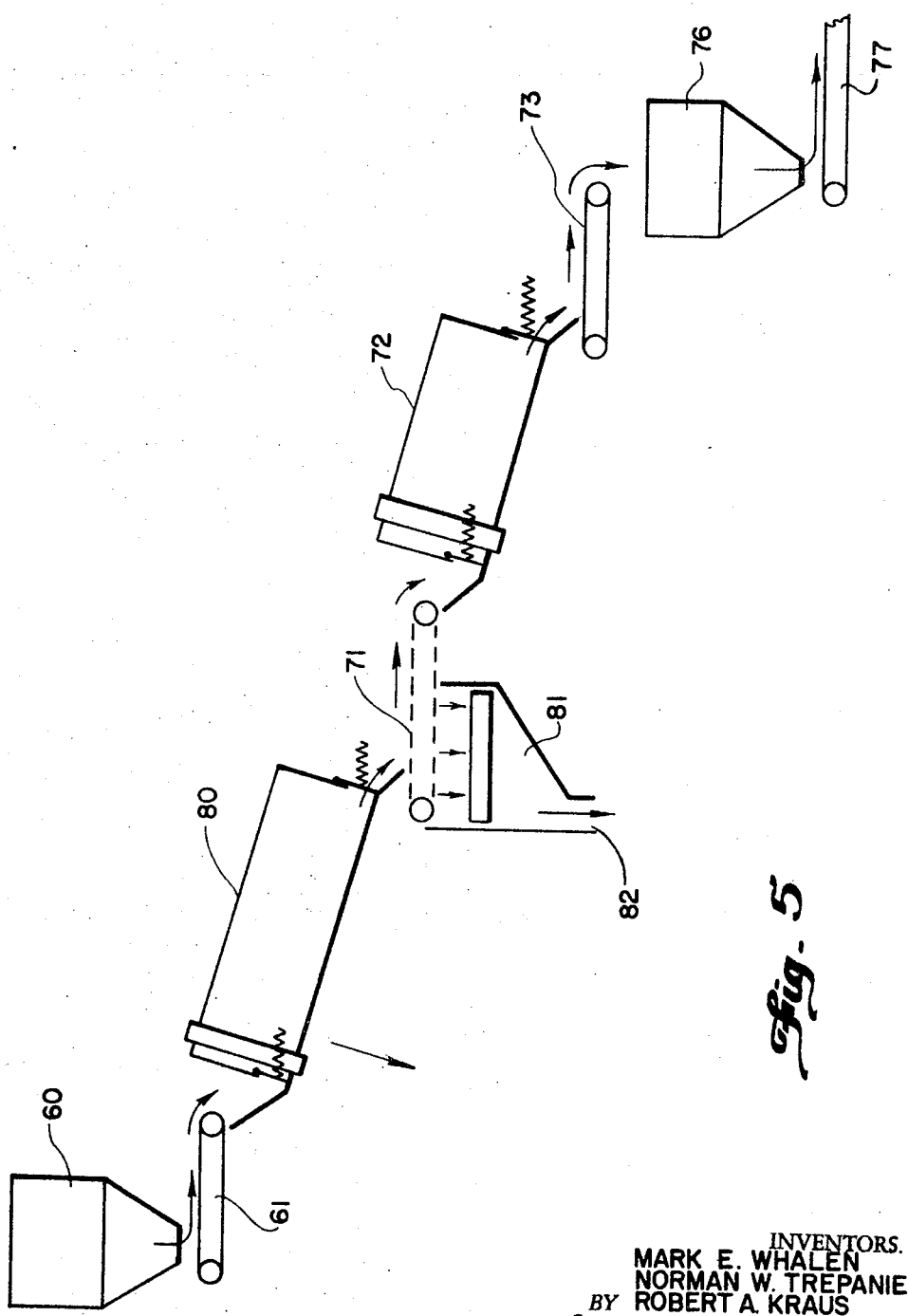

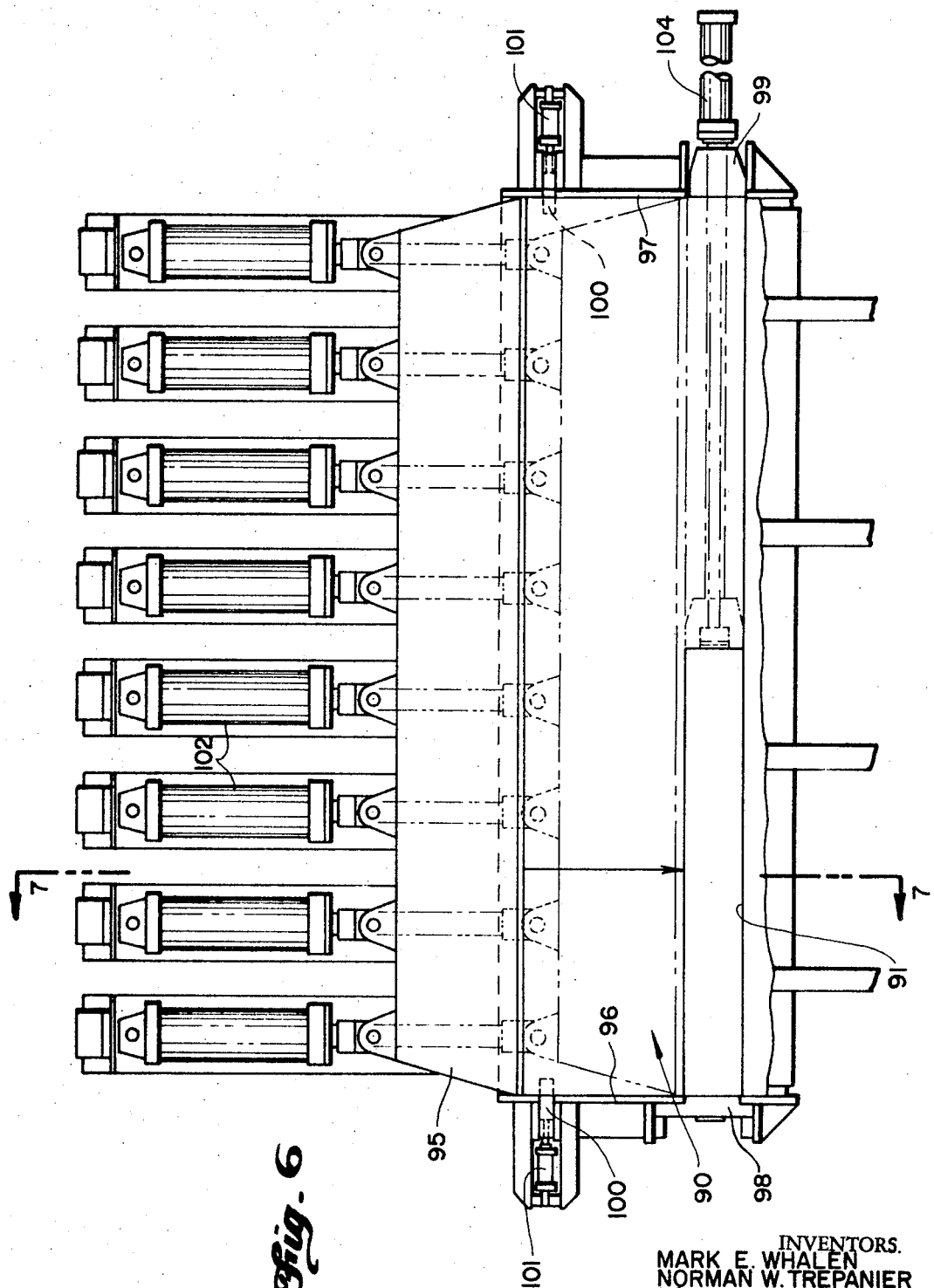

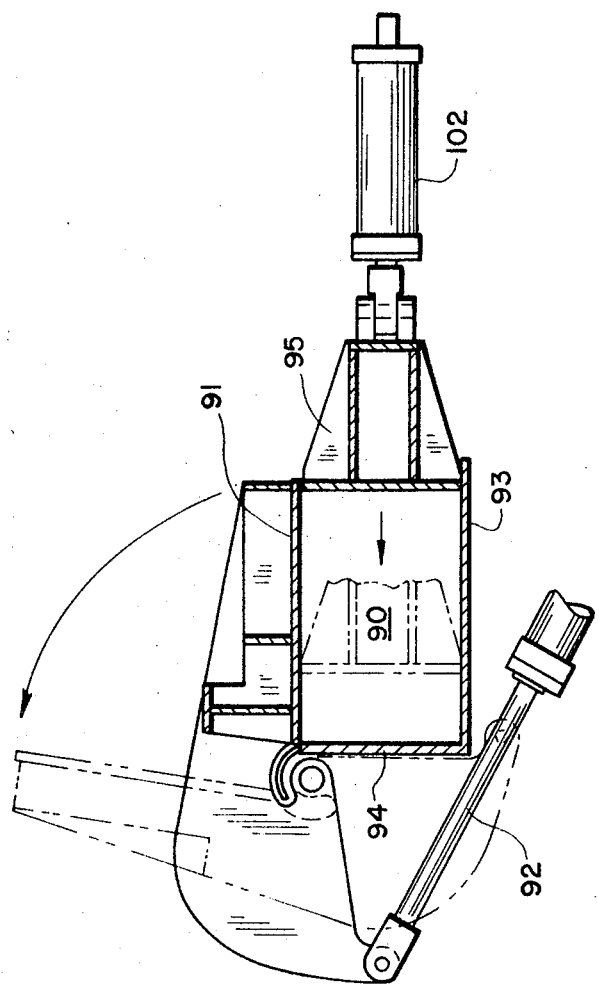

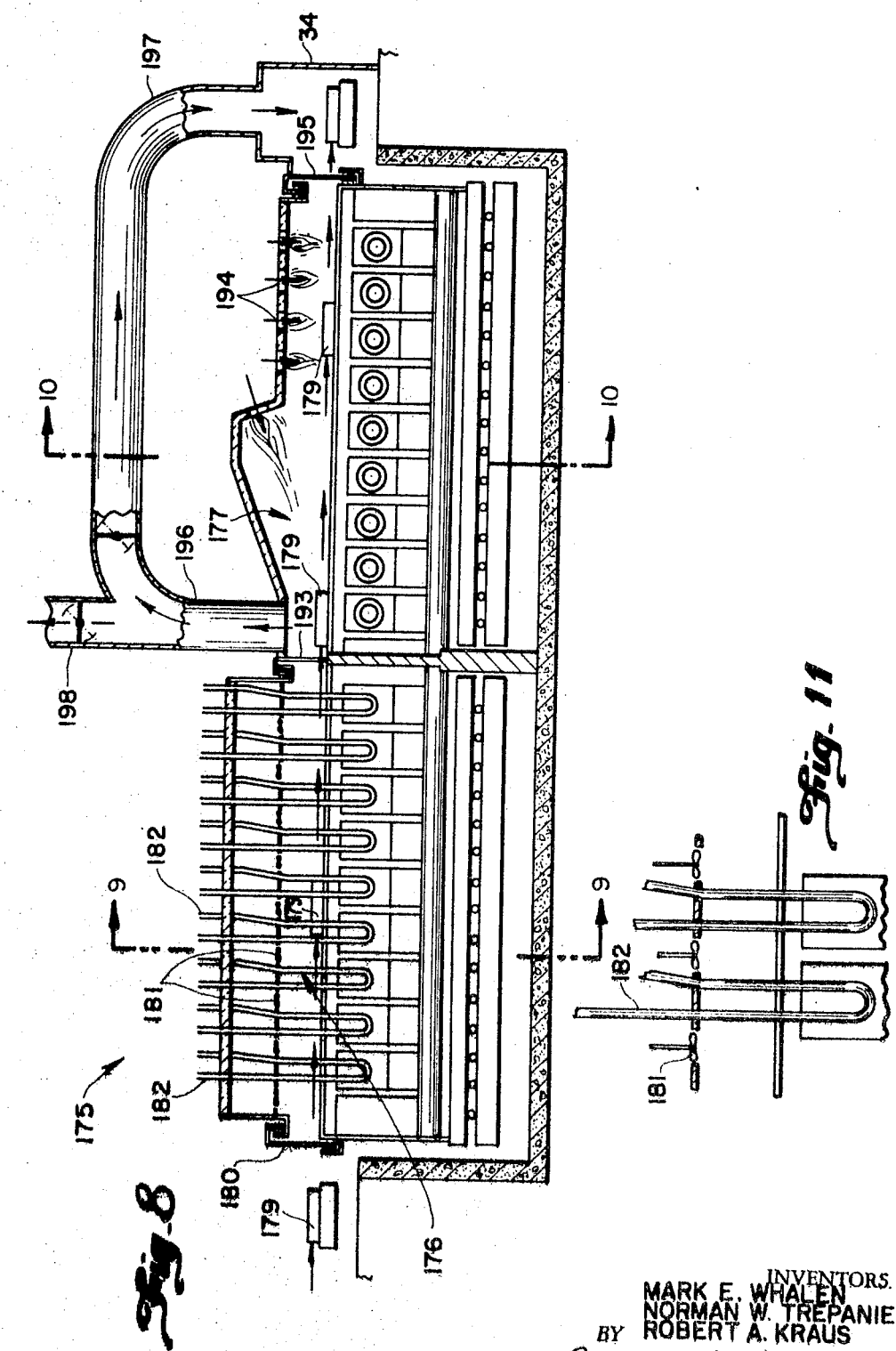

INVENTORS.
MARK E. WHALEN
NORMAN W. TREPANIER
BY ROBERT A. KRAUS

ATTORNEYS

SOLID STATE METHOD FOR CONSOLIDATING SMALL PIECES OF METAL INTO A WORKPIECE

CROSS REFERENCE TO RELATED APPLICATIONS

United States patent application Ser. No. 122,110 filed concurrently herewith by Mark E. Whalen, et al. entitled NOVEL APPARATUS AND SOLID STATE METHOD FOR CONVERTING SMALL PIECES OF METAL TO A WORKPIECE.

United States patent application Ser. No. 164,789 filed July 21, 1971 by Mark E. Whalen, et al. entitled APPARATUS AND SOLID STATE METHOD FOR CONVERTING SMALL PIECES OF STEEL TO A WORKPIECE, as a continuation-in-part of the above-referenced application.

BACKGROUND OF THE INVENTION

1. Field of the Invention

This invention relates to a method of converting scrap metal pieces to a body of solid metal useful in a manufacturing operation.

2. Description of the Prior Art

It is well known that in conventional commercial processes for the conversion of scrap steel to commercial steel, the scrap metal is melted and then processed with conventional steelmaking techniques. Except for the melting scrap, such scrap conversion does not employ any processes which are uniquely demanded by the presence of scrap.

It has long been recognized that scrap metal, particularly a type known as "prompt industrial" resulting from automotive car body stampings, is of high quality and that there should be some method of utilizing it as a raw material without the expense of returning it almost to the start of the conventional steelmaking cycle. This recognition has led to proposals for the conversion of scrap steel into a useful solid-steel product while maintaining the steel in its solid state. While there have been a number of such proposals, none was achieved a useful commercial acceptance. While there are many contributing factors in the failure of prior proposals, the principal factors are believed to be:

1. Where it has been proposed to continuously compress pieces of scrap together to cause them to weld into a useful product, there has not been a recognition of the need for inhibiting dissipation of the compressive forces laterally with respect to planes in which the forces are applied and particularly with respect to the utility of strain rate control.

2. The processes were such as to degrade rather than enhance the qualities and properties of the steel raw material with the result that the finished product, if one could be achieved at all, was of little commercial value.

3. There has been a failure to properly select and segregate scrap so that the scrap used as raw material is compatible to produce a good quality finished product from a solid state process.

4. Prior proposals to convert scrap to solid steel via compression have not sufficiently reduced the thickness of a given volume of scrap to achieve full homogeneity and welding of the components.

SUMMARY OF THE INVENTION

The present application represents the initial work of the named three inventors in developing the concept of a novel method for converting scrap steel into a usable steel body. The referenced concurrently filed application represents the later work of four inventors in implementing the initial concept. Some portions of the specification of both cases are identical so as to explain in both cases the variations in application and the ramifications of the inventions. However, the invention summaries and the claims of the two cases clearly show the line of demarcation between the cases.

The methods and apparatus of the present invention allow great latitude in (1) the selection of the quality of the steel to be produced by the process; (2) the proximity of the scrap to the location where the useful steel is produced; (3) the source of pieces to be converted to a useful product by a solid state process; and (4) the required capital investment which can vary materially according to the quality and the quantity of product to be produced.

While there are many variations in the process, in any of its forms it includes the steps of:

1. Maintaining pieces of metal together for further processing comprising multiple steps of cold compaction.

2. Heating the pieces of metal.

3. Impacting the pieces while hot to produce a metal body and thereafter continuing the impaction of the body so that the pieces forming the body are welded together into a cohesive, homogeneous slab.

Since there are many variations according to the conditions encountered, a particular situation is selected to trace the process through in a preferred system for making high-quality steel from scrap. Specifically, many automotive stamping plants use very high quantities of high-quality sheet steel. These plants produce, as a result, relatively large quantities of steel scrap which is of fairly uniform chemical consistency. In converting the scrap to useful steel, scrap having a chemistry substantially that which is desired in the finished product is segregated. As described more completely presently, the scrap is cleaned and is taken to balers where it is mechanically compressed into bales. The scrap comprises about 50 percent or less of the volume of the initial finished bale and about 80 percent or more of the cold pressed bale.

In this example of the present invention, the baling is important. By utilizing baling techniques either static or dynamic with an admixture of sizes and shapes of the pieces of scrap, the scrap itself becomes interlaced and intertwined to provide a cohesive body. The cohesiveness of the body contributes to the inhibition of force dissipation when the body is impacted. Thus, the interlocking pieces of scrap themselves resist force dissipation longitudinally of the bale as the bale is progressively compressed as is through the press which may be hot or cold. If the press is cold, it can be considered to be a continuous second stage baler.

The bales are transported to a two-zone furnace and heated to from 1,400° to 2,000° F. for a subsequent conversion of the bale to a slab of homogeneous steel. It should be noted that while this is a practical commercial range, temperatures of from 1,250° F. to melting can be employed.

The first zone of the furnace contains an inert atmosphere created by natural gas plus stoichiometric ambient air not to exceed 85 percent. The first zone mixture is combusted so as to achieve heating of the jumbo bale up to 1,292° F. which is the carburization risk temperature. The second zone is provided with a reducing atmosphere generated by the combustion of natural gas with a 50 percent stoichiometric oxygen and/or heated air so as to achieve a terminal temperature in the jumbo bale of about 1,800° F.

Preferably while under the influence of the reducing atmosphere to protect against chemical reaction of the constituents, the cold pressed bale is delivered from the heating furnace to the entrance of a novel harmonic forging press for forging while hot. The novel harmonic press is described and claimed in the referenced concurrently filed application.

The harmonic press plays a very important role in successfully converting the bale to solid steel. The press has side restraints of the width of the original jumbo bale. This constrains the bale against lateral movement as it is forged and therefore against lateral dissipation of the forces. The platens are driven at harmonic speeds of the order of twelve revolutions per second (rps). by impacting the bales at these very high speeds, the forces effect high pressure compression and therefore molecular migration and welding in planes transverse to the path of workpiece travel. The sharpness and quickness of the impactions is such that the longitudinal dissipation of the impacting forces is essentially avoided. It will be appreciated that tremendous forces of typically the order of 20,000 psi and in the range of 9,800 psi to 45,000 psi must be imposed on the bale in order to effect a welding in the temperature range here involved. The same pressures are required to effect cold compaction using the same harmonic press when densities between 65 and 90 percent are desired.

The bale is forged by the press until it is in solid condition. The forging by the press continues until the thickness of the bale is reduced an additional 30 percent or more after reaching solid so that the bale leaves the press in the form of a solid slab of steel. During this forging, the bale is perimetrally restrained so that the sharp, rapid impactions by the platens impact high forces substantially in planes. These high forces in the appropriate conditions of confinement and temperature cause molecular migration and welding of the scrap into a homogeneous, unitary slab.

Upon completion of the harmonic compaction work, preferably solid in one pass and to finished dimension in two or three passes, the formed slab is transferred to a holding station or directly fed to the reheating furnace of a hot strip finishing line where an oxidizing atmosphere up to approximately 2,550° F. is normally employed. Then, the formed slab is subjected to multiple roughing stands and a finishing train and standard conventional cold strip process for producing deep drawing quality sheet. This method of steel forming provides an increase in yield over conventional steelmaking practices using melting.

As has been indicated, the preceding summary is of a typical application of the processes and apparatus of this invention. As has also been indicated, there are many variations which can be used. Subsequently, these variations are all described in detail. Prior to that detailed description in an introductory and summary discussion, some of the more important variations and additional novel aspects of the invention are presented.

Other objects and a fuller understanding of the invention may be had by referring to the following description and claims taken in conjunction with the accompanying drawings.

BRIEF DESCRIPTION OF THE DRAWINGS

FIG. 2 is a schematic diagrammatic view of the steps performed at the location where scrap is generated including cleaning of the scrap and then baling of it;

FIG. 3 is a schematic view of the processes employed in converting a bale of scrap to a coil of steel strip;

FIG. 4 and FIG. 5 are schematic views of scrap cleaning equipment;

FIG. 6 is a top plan view of a baler;

FIG. 7 is a sectional view of the baler as seen from the plane indicated by the line 7—7 of FIG. 6;

FIG. 8 is a sectional view of a two-zone furnace utilized in this invention;

FIG. 11 is an enlarged sectional view of a portion of the furnace of FIG. 8;

DESCRIPTION OF THE PREFERRED EMBODIMENT

For clarity, the specification will be broken into six separate sections. These sections are:
I. The Overall Process
II. Cleaning of the Scrap
III. Baling of the Scrap
IV. Bale Heating
V. Bale Compaction
VI. Slab Rolling

I. THE OVERALL PROCESS

Figure 1:
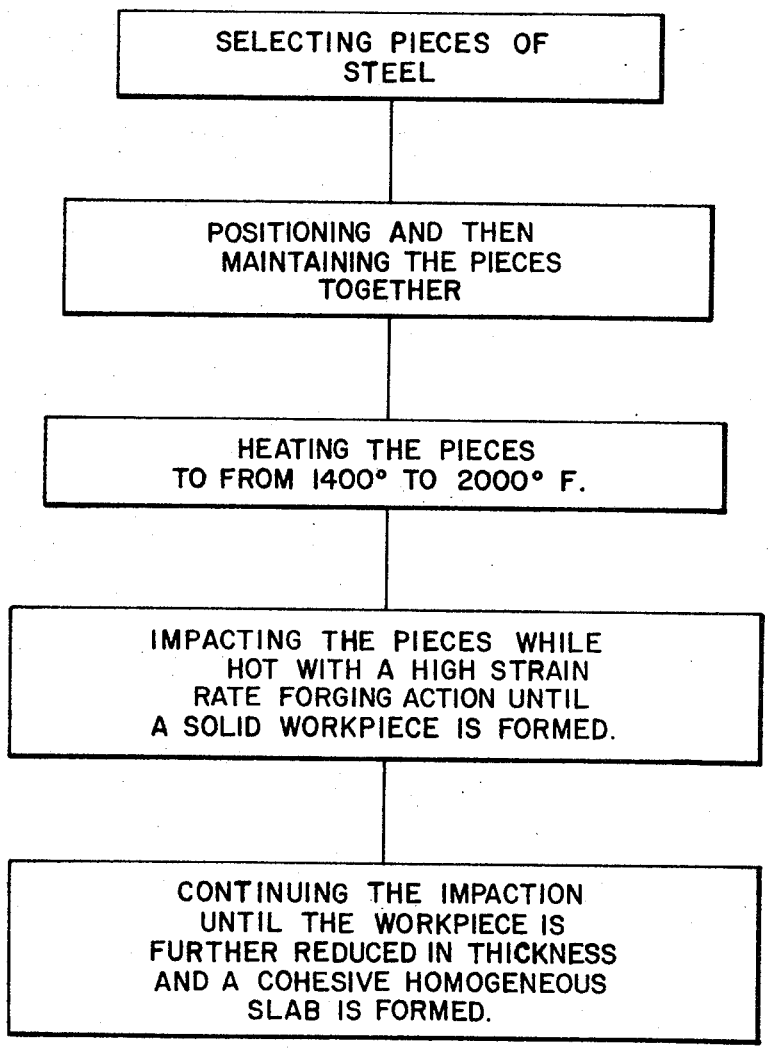
FIG. 1 is a flow diagram of the process.
Figure 10:
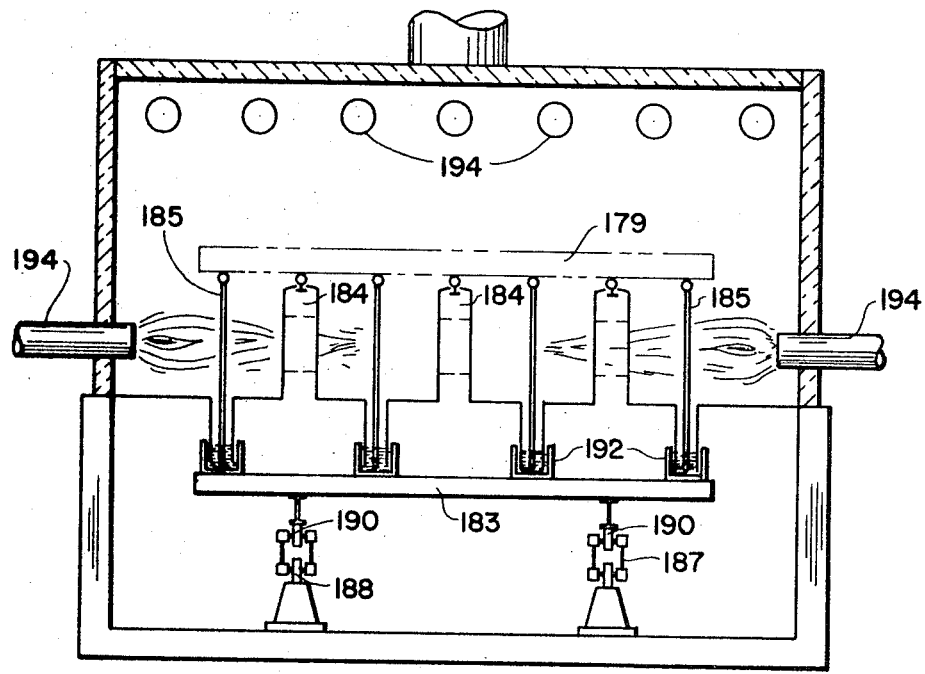
FIGS. 9 and 10 are sectional views of the furnace of FIG. 8 as seen respectively from the planes indicated by lines 9—9 and 10—10 of FIG. 8.

Referring now to FIGS. 1–3, FIG. 1 is a flow diagram of the process, while FIGS. 2 and 3 together are a schematic diagrammatic view of the flow of material from scrap to finished steel sheet in a high volume application of the invention. The equipment shown there has a capacity of the order of 300 tons per hour.

Referring specifically to FIG. 2, a pile of scrap is depicted at 10. This scrap pile depicts a segregated scrap pile composed of steel scrap having a chemistry of the desired finished process. For example, the scrap ideally will be steel having a carbon content of from 0.1 to 0.5 percent and will be a gauge of 0.07 inch or less in random shapes.

The scrap is diagrammatically shown as loaded in a freight car 11 for transport to another location indicated at 12. At the location 12, an electromagnet 13 is shown transferring the scrap to a truck shown schematically at 15. The truck 15 then transports the scrap to a charge hopper 16 for charging the scrap into a rotary kiln shown generally at 17.

As will be explained in greater detail presently, in that situation where the finishing of conversion of the scrap to a usable solid steel product is at some location reasonably remote from the scrap source and baling operation, the rotary kiln 17 will normally not be used. The kiln 17 is ideally used in that situation where the scrap is converted to solid steel at a nearby processing plant or where a special quality finished product is desired.

The depicted kiln is one in which a reducing atmosphere of from 700° to 1,000° F. is employed. The reducing atmosphere will be composed of natural gas and oxygen with a mixture which is 45 to 55 percent stoichiometric. The principal purpose of the kiln is to remove oils and residues such as palm oil without producing a blue oxide on the steel. If the steel scrap is excessively oxidized or enhanced bonding at lower temperatures is desired, it is shot blasted subsequent to its treatment in the rotary kiln.

After the scrap has been cleaned in the kiln, it is transported to a baler. In FIG. 2, a transport car 20 is shown schematically for this purpose. The scrap is charged into a baler 21. Here the scrap, which is an admixture of random sizes, is compressed by a pressure of the order of 1,000 to 7,500 pounds per square inch until it is from 20 to 50 percent densified and preferably approximately 35 percent dense when the bales are to be joined by welding. By these percentages it is meant that scrap is typically formed into a bale in the shape of a rectangular solid with a preferred 35 percent of the volume of that solid being steel. Thus, The bales are compressed to a condition for transport from the baler when they weight from 100 to 300 pounds per cubic foot.

The baling of an admixture of random sizes is highly important to the performance of the process of this invention. As will become more apparent presently, the baling causes the scrap pieces to become physically intertwined and interlocked to provide a bale having an inherent strength and rigidity. The strength and rigidity not only serves a more conventional function of facilitating the transport of the scrap in a condensed way, but also, more importantly, is a major factor in inhibiting longitudinal dissipation of impact forces during a subsequent forging operation.

If the scrap, prior to baling has been cleaned in a kiln 17, it is next placed in covered railroad cars and the like for transport to the location of subsequent stages of the process. If, however, kiln cleaning is avoided as has been suggested above, it is preferred that the bales be oil immersed to protect them during shipment and then shipped to another location for further processing.

Referring now to FIG. 3, a bale 22 is shown being delivered to a cold harmonic press 24. The bale 22 is fed to and through the cold harmonic press 24 for compression until it is from 60 to 80 or 90 dense. Preferably it is compressed until it is somewhat impervious to gases beginning at about 60 percent. In short, it is compressed until the rectangular solid represented by the compressed slab 25 is a volume which is preferably 75 percent metal, by volume.

The cold press can, as is described in greater detail in the referenced concurrently filed application be eliminated. Its principal functions are to assist in the economic utilization of equipment further downstream in the steel formation process. Specifically, a more compressed bale is more efficiently and expeditiously heated in the ovens and, since less reduction is required, obviously more efficiently and expeditiously fully compressed in a subsequent hot compression press.

As suggested by the previous percentage ranges on densities at completion of the baling and cold compaction operations, the cold harmonic press 24 reduces the thickness of the slab by over one-half from its initial baled dimension. The press, which will be described in greater detail in Section V, achieves this with pressures of up to 35,000 or more pounds per square inch at feed rates of the order of 12 bales per hour. Statically, baling pressures of 35,000–75,000 pounds per square inch would be required.

The cold compressed bale 25 is shown on a conveyor 26 being transported to a two-zone furnace shown generally at 27. As it passes along the conveyor 26, it is preheated by exhaust gases emanating from a plenum 28 fed by exhaust gases from the oven through a conduit 29. The preheated bale 25 is fed into a first furnace zone 30 where it is heated from 1,000° to 1,200° F. in an inert atmosphere. The cold compressed bale is thence transported to a second zone 31 where it is heated to from 1,200° to 2,000° F. in a reducing atmosphere. This reducing atmosphere assists in the removal of residual oxides.

The hot cold compressed bale, identified by the numeral 25A is fed along another conveyor 33 under a hood 34 supplied by escaping oven gases. Thus, the hot bale 25A is maintained in the oven atmosphere until condensed to a solid slab. A stack 25 is provided to deliver furnace gases from the hood 34 to the furnace near its inlet or feed end and to the plenum 28 used for preheating the slab.

The hot forming harmonic press is shown at 36. The hot press is used to reduce the bale until it is a solid mass of steel and thereafter to continue the reduction until it has been reduced by about 30 percent from its thickness when it becomes solid. As will be described in greater detail in Section V, the hot press 36, like the cold press 24, has side restraints of a width equal to the width of the original bale dimension. Accordingly, in compressing the bale until it is a thin solid slab, the thinning results in compaction and elongation, not widening.

In the hot harmonic press, the bale is impacted with sharp, rapid blows. Because of the interaction and intertwining of the components of the bale, and because of the inertia of the mass of the bale, the forces imparted to the bale by the harmonic press platens are essentially in planes of compaction. Because the forces are confined essentially to planes of compaction, the forces serve almost exclusively to compress and weld the scrap pieces. With proper impaction and proper combination of temperature and pressure, molecular migration is achieved at abutting surfaces so that a true weld of the components of the bale is achieved and the resultant slab, shown at 38, is a homogeneous piece of solid steel.

If one wishes to form, for example, a rectangular billet rather than a slab, or otherwise reduce the transverse dimension of the work product, a side impacting harmonic press 39 is provided downstream from the press 36. The press 39 is the same as the press 36 with the exception that the impactions are from the sides rather than the top and bottom.

If the ends of the slab 38 require trimming, this can be done with either a flame or an hydraulic shear indicated schematically at 40. The slab then may be delivered to a slab piler 41. Preferably, however, the slab is transported directly and while hot to a mill indicated generally at 42.

The mill 42 is of the planetary type because of the compact nature of it, its relatively low capital investment and —more importantly in the present disclosure—because it can take the slabs 38 while hot and roll them into sheet. This is desirable from the standpoint of inhibiting delamination of the slab which may occur if the preceding manufacturing steps have not been optimally performed in the preferred way or if the scrap is not of appropriate grade and kind.

The planetary mill 42 includes an entry table 44 for feeding the slab 38. A continuous reheating furnace 45 is provided to re-elevate the temperature of the slab to its rolling temperature of up to 2,350° F. if it is excessively cooled.

After the slab passes through the oven, it passes through a descaling unit 46, thence through pusher rolls 47 to feed rolls 48. The feed rolls feed the slab into the planetary assemblies 50 which achieve the rolling reduction from slab thickness to strip. The strip will be of the order of less than 1/20th of the original dimension of the bale. The strip passes from the planetaries 50 through pinch rolls 51 across an exit table or conveyor 52 and thence through another pair of pinch rolls 53 to a coiler 54.

II. CLEANING OF THE SCRAP

FIG. 4 is a schematic showing of the method of scrap cleaning for the process as described in Section I. A supply hopper 60 is provided. The supply hopper deposits scrap on a scrap supply conveyor 61. The supply conveyor delivers the scrap to a rotary kiln 17'. The kiln has a guide chute 62 which guides the scrap deposited by the conveyor 61 into the kiln.

The kiln 17' includes a rotary retort in which direct flame impingement, depicted by the burner 63 is applied to the pieces of scrap. Oil vapor is collected by a hood 65 and transmitted through a duct 66 to a condenser and recovery system. To keep the kiln closed for efficient recovery of the oil vapors a feed door 67 is provided. The feed door 67 is schematically shown as spring biased to indicate that it opens at the time when scrap is being charged in the kiln and is otherwise closed.

As previously indicated, the scrap is heated in the kiln to from 700° to 1,000° F. to clean off oil residues and the like. If rusting is present, a reducing atmosphere is used which is composed of a mixture of oxygen and natural gas. The gas mixture is from 45 to 55 percent stoichiometric.

After the scrap has been cleaned by the frame impingement, it passes through a water-cooled section 69 and thence through an exit door 70. The scrap, after passing through the exit door 70 is deposited on a transfer conveyor 71. The transfer conveyor 71 transfers the scrap to a mechanical tumbler 72 where the scrap is further cleaned by tumbling. Abrasive shot or grit may be employed in the tumbler 72 to improve the cleaning action.

After tumbling, the scrap is deposited on a second transfer conveyor 73. The second transfer conveyor is made permeable so that abrasives, if used, will drop through the conveyor into a funnel 74 and thence be delivered through a funnel exit 75 to a collection station.

The cleaned scrap is transmitted by the second transfer conveyor to a collection and baler supply hopper 76. A baler supply conveyor is shown at 77 which transfers clean scrap from the hopper 66 to the baler for baling in the manner described more completely in Section III.

In FIG. 5, an alternate method of scrap cleaning is shown. There the same supply hopper 60 and scrap conveyor 61 are employed. A wash tumbler 80 is provided. The wash tumbler is one in which the scrap is treated with a detergent solution to wash away residues. Here, the first transfer conveyor 71' is porous so that the detergent solution will drop into a collection funnel 81 for delivery through a conduit 82 to a detergent recovery station. The washed scrap is then passed through the tumbler 72 to a second transfer conveyor 73'. As shown in FIG. 5, the second transfer conveyor is not permeable as shot cleaning is normally not required in combination with detergent cleaning.

III. BALING OF THE SCRAP

FIG. 6 is a top plan view of a baler 89. The baler 89 includes a charge space 90 into which scrap is charged when a baler cover 91 is open as shown in FIG. 6. Referring to FIG. 7, the baler cover 91 is shown in its closed position in solid lines and in its open position in phantom. A cover actuator 92 is provided for opening and closing the cover.

The baler charge space 90 is defined, on its bottom and one side, by fixed bottom and side plates 93, 94. These plates 93, 94 extend the length of the charge space 90. The top of the charge space 90 is defined by the cover 91 when it is closed and the other side of the charge space is defined by an elongated, movable, first stage ram 95. The first stage ram 95 extends the length of the charge space 90.

The ends of the charge space are defined in part by a pair of fixed plates 96, 97. The remaining portions of the ends of the charge space 90 are defined by a movable exit door 98 and by a second stage compaction and ejection ram 99.

In operation, the charge space 90 is filled with scrap at a time when the baler cover 91 is open. The cover is then closed. Latches 100 are then positioned to latch the cover in its closed position by energizing cover latch actuators 101. Next, the elongated ram is moved from its solid-line position of FIGS. 6 and 7 to the phantom position shown in FIG. 6. This effects a first stage compaction of the scrap in the charge space 90. This compaction is achieved by simultaneously energizing eight first-stage ram actuators 102.

After the first-stage reduction of the scrap has been accomplished, a compaction and ejection actuator 104 is energized to move the second stage ram 99 from the position shown in solid lines in FIG. 6 to the position shown in phantom. This phantom position is approximately one-half the distance between the fixed plates 96 and 97 so that a 50 percent reduction in bale size is accomplished in the second stage.

After the second stage reduction has been accomplished, the exit door 98 is opened and the bale is ejected by further movement of the second stage and discharge ram 99 from its phantom position to the left toward the exit door to eject the bale from the baler.

IV. BALE HEATING

To achieve bonding between scrap or metallic elements of a bale, within commercial practicality, thermal energy must be imparted to the bale so that it attains a temperature in the range of 1,400° to 2,350° F.

Exactly what terminal temperature is selected depends upon the designed strain rate and distributed pressures used in the hot compaction as discussed more fully in Section V.

In the present method, the furnace is divided into two or three zones. In a first zone of the two-zone version, the scrap bale is heated to about 1,000° to 1,200° F. A second stage of heating is then carried out in a second zone having a reducing atmosphere of natural gas and air. Here, the supply air is preheated to raise the atmosphere temperature to the desired level while achieving the desired reducing atmosphere.

Referring now to FIG. 8, a two-zone furnace is shown generally at 175. The furnace has a first zone 176 in which the temperature of the bales is elevated to a temperature of from 1,000° to 1,200° F., preferably in an oxidizing atmosphere. The bales pass from the first zone to a second zone 177 where a positive pressure of reducing gas is maintained and the temperature of the bales is elevated from 1,200° to 2,000° F. or as high as 2,350° F.

A bale 179 is fed from the left, as viewed in FIG. 8, through an entrance door 180 into the first zone 176. There, fans 181 (as best illustrated in FIG. 11) are provided to circulate furnace gases. Thus, the slab heating in the first zone is indirect heating through the circulation of the furnace gases. Heat for the circulating furnace gases is supplied through the radiant tubes 182. A mixture of natural gas and combustion air is circulated through these radiant tubes 182 to heat them to the desired temperatures and the circulating gases around the tubes transfer the heat to the bales 179.

Figure 9:
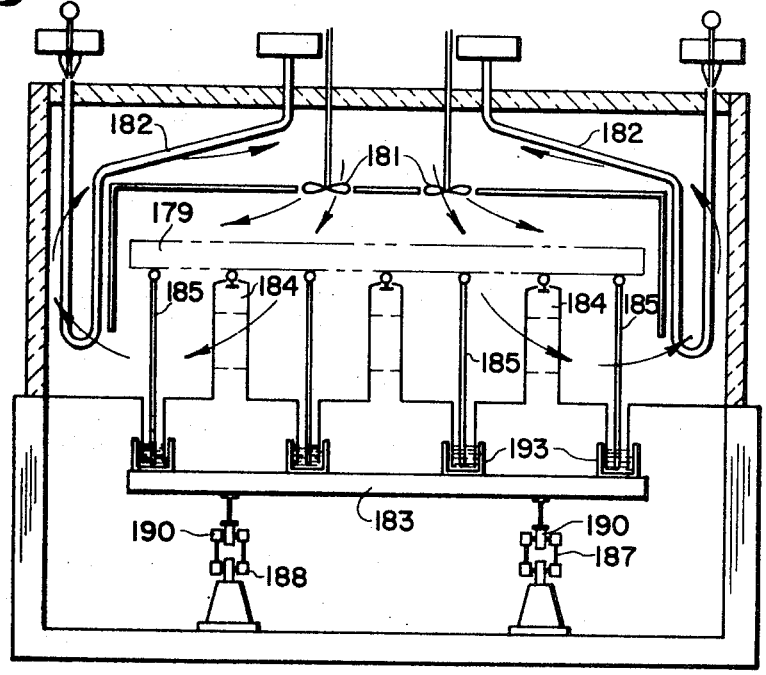

The bales are transported through the furnace by a walking beam. This beam has, referring to FIG. 9, a base platform 183. This platform is periodically elevated so that walking beam elevators 184 lift the table 179 off fixed stanchions 185. When the bale is so elevated, the platform 183 and the elevators 184 are caused to move longitudinally of the furnace in a manner which will be described presently. The platform 183 and its elevators 184 are then lowered to deposit the bale 179 on the fixed stanchions 185. The platform and elevators are then reciprocated in the opposite direction while below and out of contact with the bales and the cycle is repeated to sequentially move the bale longitudinally through the furnace.

Figure 12:
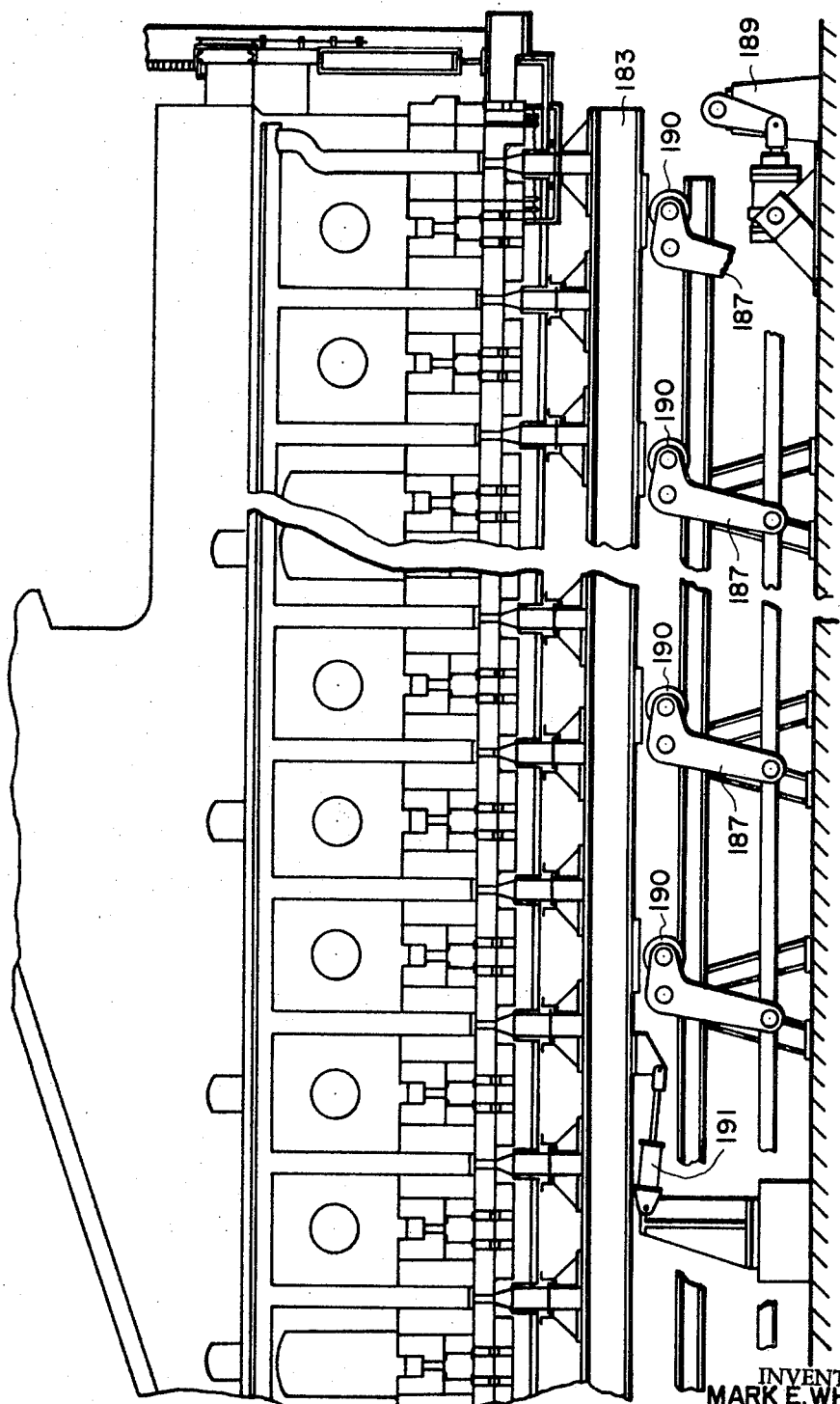
FIG. 12 is an enlarged sectional view showing the walking beam employed in this invention to transport bales through the furnace.

Referring now to FIG. 12, the mechanism for elevating the platform 183 and the elevators 184 is shown. A plurality of elevator levers 187 are pivotally mounted below the platform 183. An actuating rod 188 is pivotally connected to each of the elevators levers 187. When an actuator 189 is energized, it moves the actuating rod 188, causing the levers 187 to pivot. Rollers 190 on the levers then act against the platform 183 to lift it. This elevates the bales above the stanchions 184.

A bale advance cylinder 191 is then energized to shift the entire platform 183 and the supported bales longitudinally while supported on the rollers 190. The elevator actuator 189 is then operated in the opposite direction to lower the walking beam until the bales are supported on the stanchions 185. The beam cylinder 191 then operates in the other direction to shift the platform 183 to the left as seen in FIG. 20 and the cycle is complete.

After a slab 179 has passed through the first zone 176, a zone division door 193, best illustrated in FIG. 8, is opened and the bale is transported into the second zone. Here, heating is accomplished by flame impingement with flames emitted from burners 194. These burners direct the flame both from the sides and from the top to achieve the high heats desired. Air supplied to the burners 194 is preheated, in a manner not shown, by exhaust gases from either zone. After the slab has been heated in the second zone 177, it passes through an exit door 195.

Exhaust gases are extracted through a stack 196. The stack has two outlets, one of which, 197, directs gases to the hood 34 while the other, 198, can exhaust excessive gases. In addition, suitable ducting, not shown, can be provided for the preheat described in Section I.

V. BALE COMPACTION

Figure 13:
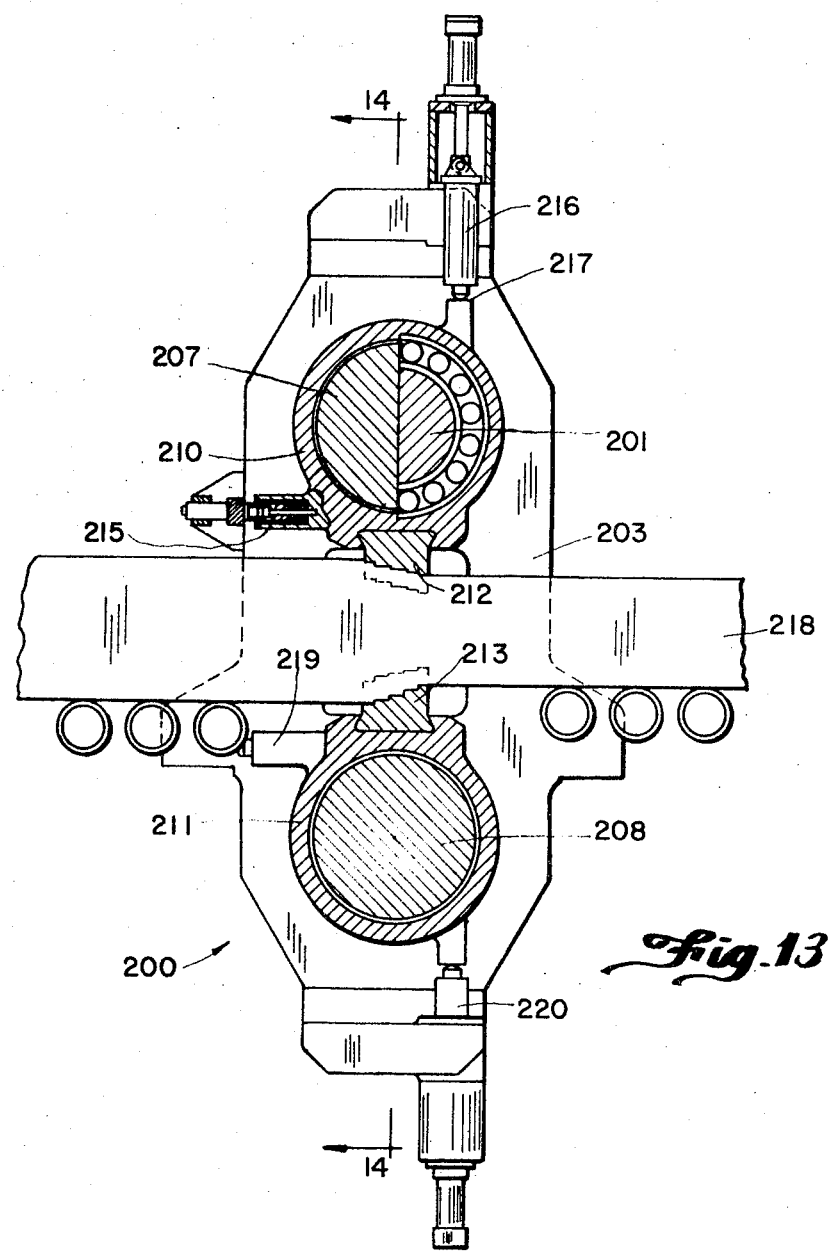
FIG. 13 is a sectional view of the harmonic press utilized in this invention.
Figure 14:
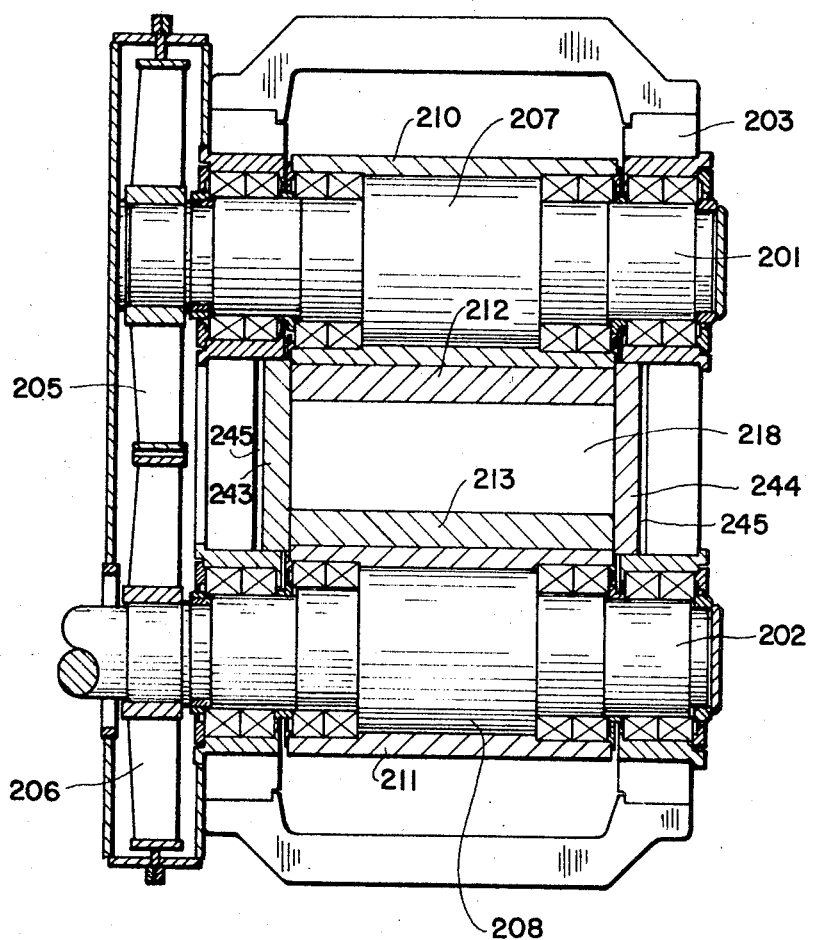
FIG. 14 is a sectional view of the harmonic press of this invention as seen from the plane indicated by the line 14—14 of FIG. 13.

FIG. 13 is a vertical sectional view of a harmonic press 200. The press as shown in FIG. 13 is essentially a prior art press designed to act as a feed mechanism for other mills reducing solid steel. FIG. 14 is a sectional view of the press of FIG. 22, but modified from the prior art in respects that will be described.

Referring to FIGS. 13 and 14, a pair of eccentric shafts 201, 202 are journaled in a frame 203. Gears 205, 206 are connected to the shafts 201, 202, respectively, to drive them in synchronized and opposite rotation. Suitable drive gearing, not shown, is coupled to the gears 205, 206 to cause this synchronized and opposite rotation.

The shafts 201, 202 have eccentric central portions 207, 208 respectively. These eccentric portions are each cylindrically contoured and each has an axis which is offset from the axis of its shaft so that on rotation of the shaft, the axis of the eccentric portion orbits about its shaft axis. A pair of platen supports 210, 211 are journaled on the eccentrics 207, 208, respectively. Platens 212, 213 are carried by the platen supports 210, 211 respectively.

Referring now to the upper eccentric shaft 201, the platen support 210 carries a snubber assembly 215 which inhibits rotation of the platen support 210 in a clockwise direction with respect to the eccentric 217. The frame carries a counterclockwise snubber assembly 216 which acts against a flat 217 on the platen support 210 to inhibit counterclockwise rotation of the platen.

As a workpiece 218 advances from the left to the right as viewed in FIG. 13, leading portions of the platens 212, 213 strike the workpiece first. This initial striking causes the upper platen to rotate relative to its eccentric 207 in a counterclockwise direction against the action of the snubber assembly 216. Concurrently the lower platen support 211 tends to rotate in a clockwise direction relative to its eccentric 208 against the action of a corresponding snubber assembly 219. This platen support rotation imposes stresses on the machine because of unbalanced reaction forces which occur when the entire work surfaces of the platens 212 and 213 are not striking the workpiece. Once the workpiece is fed to a position such that the entire work surface of the platens 212, 213 is impacting the workpiece, as shown in FIG. 13, the stresses become balanced.

As the workpiece leaves the impacting region below the platens, only trailing portions of the work surfaces of the platens 212 and 213 are striking the workpiece and, accordingly, the platen supports tend to rotate in directions opposite from that when the workpiece commences to feed between the platens. That is, the upper platen support 210 tends to rotate in a counterclockwise direction against the action of the snubber 216 while the lower platen support 211 tends to rotate in a clockwise direction against the action of a corresponding snubber assembly 220.

From this description of the machine shown in FIGS. 13 and 14, it will be seen that a limiting factor on the capacity of the machine is the stresses imposed as the workpiece 218 enters and leaves a forging region. Moreover, the forging pressures imposed as the workpiece enters and leaves the forging region are not reliably consistent for the limiting factors on these forces are the spring resistances of the snubber assemblies. In addition, the platens of this prior art device are designed to work at relatively low strain rates resulting from reciprocating speeds less than 4 cycles per second. Accordingly, the platens were designed with vertically disposed serrations (staircase style) throughout the entire platen surface with no attention to accommodating smooth indexing of the workpiece past the platens necessitated by higher strain rates.

Several of the outstanding features are obtained due to the impactions being so sharp and sudden. These include (1) the described inhibition of lateral force dissipation, (2) the localization of force application and (3) tests indicate that dirt pieces actually fracture and disperse.

VI. SLAB ROLLING

Referring again to FIG. 3, there is a diagrammatic showing of a planetary rolling mill. As indicated previously, the slab 38 is fed through the furnace 45 where it is reheated to an appropriate temperature which is of the order of 1,200° to 2,350° F. After reheating and descaling in the descaler 46, the feed rolls 48 feed the slab into the planetary 50 where reduction to strip is achieved.

The planetary 50 has a central, cylindrical, backing beam 285. A cluster of intermediate rolls 286 are around the backing beam and surrounded by a cluster of planetary rolls 287. The planetary rolls 287 orbit the backing beam 285 at high speed. Referring to the upper roll cluster above the workpiece as shown in FIG. 3, the orbiting is in a counterclockwise direction. Each roll 287 rotates about its own axis in a clockwise direction so that a compression and rolling smoothing action is achieved by the mill. The particular mill depicted and described is available commercially under the designation Krupp/Platzer Planetary Rolling Mill and is made by Fried. Krupp GmbH Endustriebau, Essen, Germany.

When the strip passes out of the planetary 50, it will be of the order of $x$ .07 inch thickness and be no more than one-twentieth of the thickness of the slab being fed. With this great compression and reduction, any slight defects which may have existed in the slab being fed after it has been impacted in the hot harmonic press 36 will disappear and good quality strip, quite usable for automotive and other purposes, is produced by the process.

The advantage of such an adjustable mill lies in the fact that total reduction of a hot slab, from about 7 inches average thickness to about one inch, may take place in one location obviating the need for multiple roughing stands. The solid being worked is moved through the press incrementally allowing for progressively larger reductions in thickness.

The reduction is accomplished with rollers 350, 351 which are respectively mounted on eccentric portions of the eccentric shafts 331, 332. The eccentric portion of the eccentric shaft 332 is shown at 353. The roll 351 is journaled on the eccentric portion 352 by a bearing 353. Alternately, the rolls 350, 351 may be fixed on the eccentrics to achieve a burnishing-like finishing action.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of converting random sized small pieces of steel to a steel body suitable for use in a manufacturing operation while maintaining the steel in a solid state comprising:
    a. baling the random sized pieces to effect an intertwining of bale pieces which will resist the dissipation of subsequently applied impaction forces and compacting the pieces until the bale is from 20 to 40 percent solid;
    b. thereafter repetitively impacting the bale until a time when it becomes solid and substantially free of voids and then continuing to repeatedly impact the solid bale until it is a slab having a transverse cross-sectional area less than 70 percent of the area at said time when the bale became solid; and,
    c. heating said bale to from 1,200° to 2,350° F. prior to the completion of step (b).

2. The method of claim 1 wherein the impaction is performed with a harmonic press.

3. The method of claim 2 wherein the impaction is performed with a pair of opposed, oppositely-acting platens impacting opposed outer surfaces of the bale.

4. The method of converting scrap steel to steel strip comprising the steps of:
    a. segregating scrap to select scrap pieces having chemistry substantially that of the desired chemistry of a finished product;
    b. baling the segregated scrap pieces in a baler to produce bales having a predetermined regular shape with at least 20 percent of the volume of said shape being comprised of steel scrap;
    c. cleaning said scrap prior to a subsequent compaction step either before or after said baling;
    d. compacting the bale while substantially at ambient temperatures in a cold harmonic press until said bale is a shape having at least 30 percent of its volume composed of steel;
    e. heating said compressed bale in a two-zone oven to from 700° to 1,000° F. in the first zone in the presence of an oxidizing atmosphere and from 1,200° to 2,350° F. in the second zone in the presence of a reducing atmosphere; and,
    f. impacting the bale while hot in a hot harmonic press of the type having a pair of opposed platens until the bale is converted to a body composed of solid steel and thereafter continuing to impact the bale until it is reduced to a thickness of no more than 70 percent of its thickness at the time it became a solid piece of steel whereby to convert the scrap to a slab of substantially homogeneous steel.

5. The method of claim 4 wherein said cleaning is accomplished in a rotary kiln.

6. The method of claim 5 wherein said steel is heated to from 1,000° to 1,200° F. in said kiln in a reducing atmosphere.

7. The method of converting scrap steel to a steel workpiece comprising the steps of:
   a. segregating the scrap into selected scrap pieces having chemistry substantially that of the desired chemistry of a finished product;
   b. baling the segregated scrap pieces into a plurality of relatively small bales each having a predetermined regular shape at least 20 percent of the volume of the shape being comprised of steel scrap;
   c. shipping said bales to another location;
   d. joining a plurality of bales together to form a larger workpiece composed of said plurality of bales;
   e. heating said larger workpiece to a temperature of from 1,200° to 2,350° F.; and,
   f. impacting said larger workpiece while hot in a harmonic press of the type having a pair of opposed platens until the workpiece is converted to a body composed of solid steel and thereafter continuing to impact the workpiece until it is reduced to a thickness of no more than 70 percent of its thickness at the time it became a solid piece of steel.

8. The method of converting random sized small pieces of steel to a steel body suitable for use in a manufacturing operation while maintaining the steel in a solid state comprising:
   a. baling the random sized pieces to effect an intertwining of bale pieces which will resist the dissipation of subsequently applied impaction forces and compacting the pieces until the bale is from 20 to 40 percent solid;
   b. thereafter compressing the bale by repetitive impaction until a time when it becomes solid and substantially free of voids and then continuing to compress the solid bale by repeated impaction until it is a slab having a transverse cross-sectional area less than the area at said time when the bale became solid; and,
   c. heating said bale to from 1,200° to 2,350° F. at least prior to the completion of step (b) and applying forces to all sides of said bale at least in the initiation of step (b).

9. The method of claim 8 wherein the compaction of step (b) performed with cyclically actuated compacting elements.

10. The method of claim 9 wherein the compaction of the completion of step (b) is performed with a pair of opposed, oppositely-acting platens impacting opposed outer surfaces of the bale.

11. The method of claim 8 wherein the compaction of the initial stages of step (b) is provided by a closed-cavity press with said bale ambient temperatures.

12. The method of converting scrap steel to steel strip comprising the steps of:
   a. segregating scrap to select scrap pieces having chemistry substantially that of the desired chemistry of a finished product;
   b. baling the segretated scrap pieces to effect an intertwining of scrap pieces which will resist the dissipation of subsequently applied impaction forces in a baler to produce bales having a predetermined regular shape with at least 20 percent of the volume of said shape being comprised of steel scrap;
   c. cleaning said scrap prior to a subsequent compaction step either before or after said baling;
   d. repeatedly impacting the bale while substantially at ambient temperatures in a press until said bale has at least 65 percent of its volume composed of steel;
   e. heating said compressed bale in the range of 1,200° – 2,350° F.; and,
   f. repeatedly impacting the bale while heated to a density greater than 98 percent of solid.

13. The method of claim 12 wherein said heating and heated compaction are carried out in the presence of a nonoxidizing atmosphere.

14. The method of claim 12 wherein said heated compaction is provided by at least one cyclically actuated compacting element.

15. The method of claim 14 wherein said compaction is provided by a pair of opposed compacting elements carried by a harmonic actuator with said bale passing therebetween for receiving progressive impulsed compactions therealong.

16. The method of claim 15 in which said impulsed compaction is continued until said bale has been reduced at least 30% beyond solid in said heated condition.

17. The method of claim 14 wherein said steel is heated to from 1,000° to 1,200° F. in a rotary kiln in a reducing atmosphere.

18. The method of converting random sized pieces of steel to a steel body suitable for use in a manufacturing operation while maintaining the steel in a solid state comprising:
   a. cold compacting the random sized pieces to effect an intertwining of pieces which will resist the dissipation of subsequently applied impaction forces until the compacted body is from 80 to 95 percent solid;
   b. thereafter repeatedly impacting the body until a time when it becomes substantially solid and substantially free of voids and then continuing to repeatedly impact the solid body until it is a slab having a transverse cross-sectional area less than 70 percent of the area at said time when the body became solid; and,
   c. heating said body to from 2,000° to 2,350° F. at least prior to the completion of step (b).

19. The method of claim 18 wherein said body is subjected to a surface scarfing treatment subsequent to heating and prior to the completion of step (b).

20. The method of claim 18 wherein said heating and final compaction is carried out under the influence of a reducing atmosphere.

21. The method of claim 18 wherein said pieces are substantially free of oxides on each surface thereof prior to heating.

22. The method of claim 18 in which said cold compacting is carried out in a closed cavity press with applied pressures above 35,000 psi. but not exceeding 75,000 psi.

23. The method of claim 18 in which at least the final portion the cold compaction is carried out in a open end continuous feed press with applied pressures not exceeding 30,000 psi.

24. A method of preparing steel piece material for solid state conversion into a welded workpiece, comprising:

a. introducing a supply of random sized steel pieces into a cavity;
b. compacting said pieces in said cavity to form a bale with the pieces therein intertwined to resist the dissipation of subsequently applied impaction forces, the bale;
c. thereafter repetitively impacting the bale while the pieces are maintained in solid state until it is welded into a solid homogeneous body; and,
d. heating the bale to at least 1,250° F. prior to the completion of step (c).

25. The method of claim 24 wherein said cavity is provided with corrugated surfaces to facilitate the folding and intertangling of the outermost bale pieces during compaction and thereby render said bale less pervious and requiring lower applied forces.

26. A method of preparing steel piece material as in claim 24 in which impulsed compactions are applied to said supply of pieces in said cavity to promote greater uniformity of density of said compacted bale.

27. A method of preparing steel piece material as in claim 24, in which said compacting pressures are applied at intervals while only a portion said supply has been introduced to said cavity as well as after said full supply has been introduced to said cavity, to promote greater uniformity of density in the final bale.

28. A method of preparing steel piece material as in claim 24 wherein said compacting forces are applied in more than one cycle to said supply of pieces to promote greater uniformity of density of said completed bale.

29. The method of converting pieces of steel to a solid homogeneous mass of steel suitable for use in a manufacturing operation while maintaining the steel in a solid state, comprising the steps of:
a. consolidating a plurality of pieces of steel in order to form a workpiece;
b. repeatedly impacting the workpiece while it remains in solid state in order to form a solid body free of voids with the pieces welded together into a solid homogeneous mass of steel; and
c. heating the body to at least 1,250° F. prior to the completion of step (b).

30. The method of claim 29 wherein said step of forming a workpiece comprises a cold-compaction operation performed in a closed cavity baler.

31. The method of claim 29 wherein said step of forming a workpiece includes the application of impulsed compaction forces to the pieces of steel to promote greater uniformity of density of the workpiece.

32. The method of claim 29 wherein the repeated impaction of the workpiece is carried out in a harmonic press.

33. The method of claim 29 wherein the repeated impaction of the workpiece is performed with a pair of opposed, oppositely-acting platens impacting outer surfaces of the workpiece.

34. The method of converting pieces of steel to a solid homogeneous mass of steel suitable for use in a manufacturing operation while maintaining the steel in a solid state, comprising the steps of:
a. consolidating a plurality of pieces of steel in order to form a workpiece;
b. repeatedly impacting the workpiece in a harmonic press while the workpiece remains in solid state in order to form a solid body free of voids with the pieces welded together into a solid homogeneous mass of steel; and
c. heating the body prior to the completion of step (b) to such temperature as is required in combination with the pressures developed during impaction to effect welding by molecular migration.

35. The method of claim 34 wherein the repeated impaction of the workpiece is performed with a pair of opposed, oppositely acting platens impacting outer surfaces of the workpiece.

36. The method of claim 34 wherein step (c) includes heating the body to from between 1,250° to 2,350° F.

* * * * *